Jan. 13, 1925.    1,523,153
F. K. YOUNG
ANTITHEFT DEVICE FOR MOTOR VEHICLES
Filed June 2, 1922
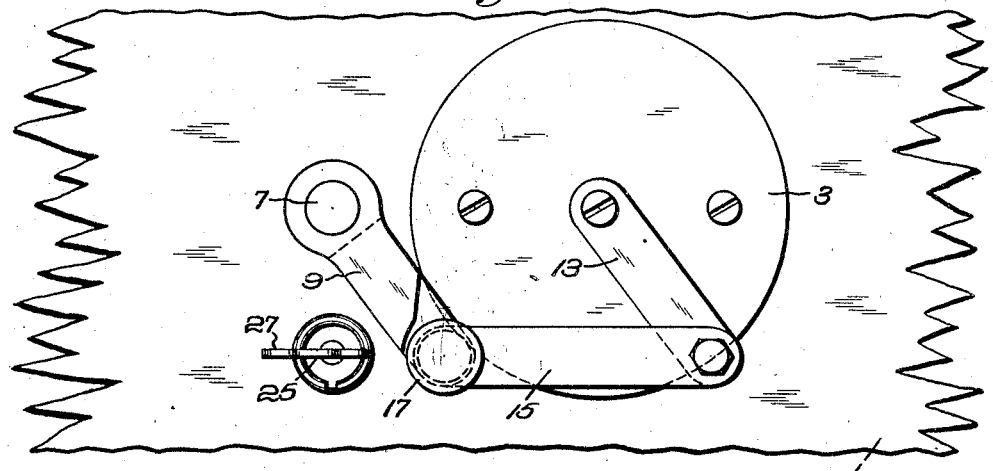
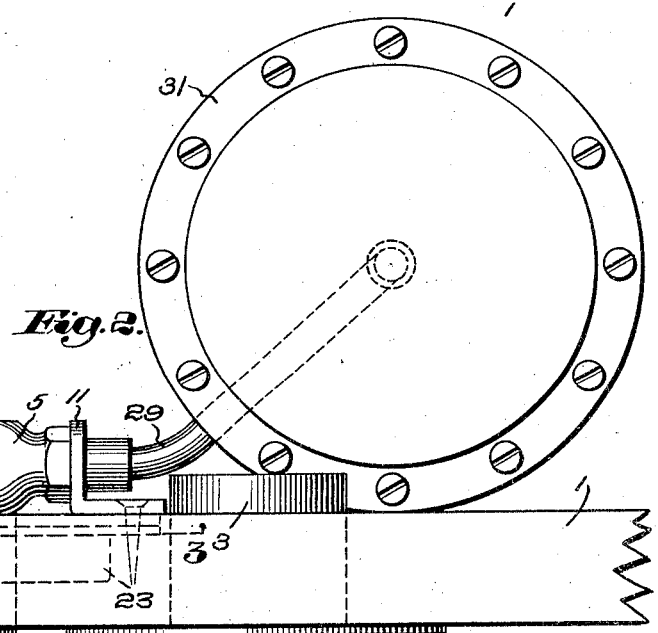
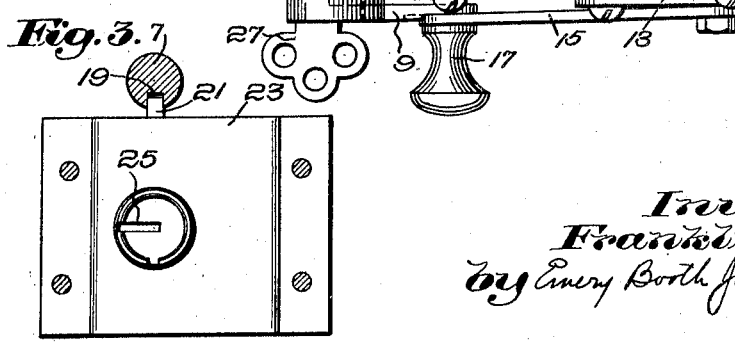
Inventor:
Franklin K. Young,
by Emery Booth Janney & Varney
Attys.

Patented Jan. 13, 1925.

1,523,153

UNITED STATES PATENT OFFICE.

FRANKLIN K. YOUNG, OF WINTHROP HIGHLANDS, MASSACHUSETTS, ASSIGNOR OF ONE-HALF TO CHARLES G. WELLS, OF BOSTON, MASSACHUSETTS.

ANTITHEFT DEVICE FOR MOTOR VEHICLES.

Application filed June 2, 1922. Serial No. 565,470.

*To all whom it may concern:*

Be it known that I, FRANKLIN K. YOUNG, a citizen of the United States, and a resident of Winthrop Highlands, county of Suffolk, and State of Massachusetts, have invented an Improvement in Antitheft Devices for Motor Vehicles, of which the following description, in connection with the accompanying drawings, is a specification, like characters on the drawings representing like parts.

My invention relates to anti-theft locking devices for motor vehicles and particularly but not exclusively is concerned with a device of this character for insuring that an absent minded operator will not leave the key in the lock when the vehicle is put out of condition for operation.

My invention has among its objects the provision of an effective, easily installed means for preventing theft of the vehicle to which it is applied and will be best understood from the following description when read in light of the accompanying drawings of a specific embodiment of my invention selected for illustrative purposes, while its scope will be more particularly pointed out in the appended claims.

In the drawings:—

Fig. 1 shows a fragment of the dash of a motor vehicle with an anti-theft device constructed according to my invention applied thereto;

Fig. 2 is a plan view according to Fig. 1; and

Fig. 3 is a section on the line 3—3 of Fig. 2.

Referring to the drawings and to the preferred embodiment of my invention, I have shown the dash 1 provided with the ignition switch indicated more or less diagrammatically at 3. At one side of the ignition switch and on the back of the dash I provide the valve 5 which may be of any suitable type and as herein submitted, is a turning plug provided with the valve stem 7 which extends through the dash and carries at its outer end in fixed relation thereto the lever 9. For supporting the valve I provide the brackets 11 carried by the dash.

The ignition switch I have indicated as provided with a lever or other operating means 13, which is connected to the stem of the switch or other part for opening and closing the switch when rotated. The levers 9 and 13 are connected for simultaneous movement by a link 15 opposite ends of which are pivoted to the ends of the respective levers. The lever 9 at its outer end carries a handle 17, which may be grasped by the operator when it is desired to actuate the switch and the valve.

The parts as shown by the drawings are in the position assumed when the valve is closed and the switch is opened which renders the motor of the vehicle inoperative. For locking the parts in this position I provide the valve stem with a slot 19 into which is adapted to enter the keeper 21 of the spring lock 23. By this arrangement it is obvious that the keeper will automatically engage the groove of the valve stem when said groove is moved into alignment with the keeper.

To insure that the key for the lock will be removed before the vehicle may be operated, the keyhole 25 for the lock is positioned so that when the key 27 is inserted in the keyhole said key is in the path of the lever 9 in such position that the key must be removed from the lock before the lever 9 can be moved to the position requisite for it to open the valve and close the ignition switch.

The valve 5 is inserted in the conduit 29, for conveying the fuel from the vacuum tank 31 to the carburetor 33. This is done for the reason that it is possible to place a shunt around the open ignition switch or to use a temporary battery for the ignition system, under which conditions if the valve were in the conduit between the gasoline tank and the vacuum tank, the vehicle could be run on the fuel stored in the vacuum tank and under some conditions for several miles.

In operation, assuming the parts are in the position shown by the drawing and it is desired to place the car in condition for operation, the operator inserts the key in the lock and turns the key far enough to withdraw the keeper 21 from the groove 19 of the valve stem. Holding the key in this position the operator then grasps the handle 17 and turns the lever 9 in a clockwise direction far enough to move the groove 19 out of registry with the keeper. The key is then removed from the lock and presumably is placed in the operator's pocket which removal permits the handle 17 to be turned clockwise far enough to open the valve and close the switch, under which conditions the vehicle may be started. When it is necessary to stop the motor the handle 17 is again turned to the position shown by Fig. 1 and is automatically locked in that position and the vehicle cannot again be put in condition for operation until the key is inserted and the parts unlocked.

If desired, the parts heretofore described may be installed as part of the equipment of the vehicle or the valve and lock may be added to an existing installation by removing the lever or other operating element of the ignition switch and substituting the lever 13 therefor. It will also be understood that the invention may be applied to locking only the switch or only the valve and further that the levers and link herein shown and described may take any convenient form for performing the results desired.

Although I have described for purposes of illustration one specific embodiment of my invention it is to be understood that I am not limited thereby to the particular mechanical details shown but that wide deviations may be made therefrom without departing from the spirit of my invention.

Claims—

1. In a motor vehicle, the combination with the actuating mechanism thereof, of controlling mechanism for rendering said actuating mechanism operative or inoperative, a lock for said controlling mechanism, a key for said lock, means for enforcing the removal of said key from said lock before said controlling means can be moved to its position in which it renders said actuating mechanism operative, and said lock after said key is removed acting without reinsertion of said key automatically to hold said controlling mechanism in the position in which it renders said actuating mechanism inoperative when said controlling mechanism is again moved to such position.

2. The combination with the actuating mechanism of a motor vehicle, of a controlling mechanism for rendering said actuating mechanism operative or inoperative, a lock for holding said controlling mechanism in the position in which it renders said actuating mechanism inoperative, said parts being so constructed and disposed to first permit said key to be inserted for unlocking said controlling mechanism, then to enforce removal of said key before said controlling mechanism can be moved to render said actuating mechanism operative, then to permit said controlling mechanism to be moved to its last named position, and finally without reinsertion of said key to cause said controlling mechanism to be locked when it is moved back to the position in which it renders said actuating mechanism inoperative.

3. In a motor vehicle, the combination with the motor thereof, of mechanism for rendering said motor operative or inoperative, a movable lever for actuating said mechanism, a lock for said mechanism for automatically locking said mechanism when said lever is moved to its position in which said motor is rendered inoperative, and said lock having a keyhole disposed to cause the key for said lock when inserted to be in the path of said lever adjacent the position of said lever in which said motor is rendered inoperative.

4. In a motor vehicle, an ignition switch for opening and closing the ignition circuit, a movable lever for operating said switch, a lock for said switch, said lock acting automatically without use of said key to lock said lever in its position which opens said circuit, and the keyhole for said lock being so disposed that the key when inserted will be in the path of said lever adjacent the position of said lever in which said circuit is open, thereby enforcing removal of said key before said lever can be moved to its position in which said circuit is closed and causing said lever to be locked without use of said key when said lever is again moved to its position in which said circuit is open.

5. In a motor vehicle, the combination with the motor thereof, of mechanism for rendering said motor operative or inoperative, a lever for actuating said mechanism and connected therewith so that the motor is inoperative when said lever is in its initial position and operative when said lever is in its final position, a lock for automatically locking said lever when moved to its initial position, and the hole for said lock being so disposed that the key when inserted is in the path of said lever in such position to allow said lever to be moved out of its initial position but not to its final position.

6. In a motor vehicle, an anti-theft lock for the operating mechanism thereof, a lever for placing said mechanism into and out of condition for operation, said lever having an initial position in which said mechanism is out of condition for operation and a final position in which said mechanism is in condition for operation, a lock for automatically locking said lever when moved to its initial position, and the keyhole for said lock being so disposed that the key when inserted is in the path of said lever in such position to allow said lever to be moved out of its initial position but not to its final position.

7. In a motor vehicle, an ignition switch, a lever for operating said switch, a lock for said switch to automatically locking it when moved to its open position, and the keyhole for said lock being so disposed that the key when inserted is in the path of said lever in such position to prevent said lever closing said switch until said key is removed.

8. In a motor vehicle, an ignition switch, a lever for operating said switch, a lock for said switch for automatically locking it when moved to its open position, and the keyhole for said lock being so disposed that the key when inserted is in the path of said lever in such position to permit movement of said lever sufficient to prevent reengagement of the lock after the key is withdrawn and to prevent movement sufficient to close said switch until the key is withdrawn.

9. In a motor vehicle, an anti-theft lock for the operating mechanism thereof, a lever for placing said mechanism into and out of condition for operation, said lever having an initial position in which said mechanism is out of condition for operation and a final position in which said mechanism is in condition for operation, a lock for automatically locking said lever when moved to its initial position, and the keyhole for said lock being so disposed that the key when inserted is in the path of said lever in such position to permit movement of said lever from its initial position sufficient to prevent reengagement of the lock after the key is turned to unlocking position but to prevent movement sufficient to allow said lever to be moved to its final position until the key is removed.

10. In a motor vehicle, means having open and closed positions and effective to render said vehicle operative or inoperative at the will of the operator, a lever for actuating said means, a lock for automatically locking said means when moved to the position rendering the vehicle inoperative, and the keyhole for said lock being so positioned that the key when inserted will be in the path of said lever in such position to permit movement of the lever sufficient to prevent reengagement of the lock after the key is turned to its unlocking position but to prevent movement sufficient to allow said lever to be moved to its final position until the key is removed.

11. An attachment for ignition switches for opening and closing an ignition circuit comprising a pair of levers one of which may be attached to the stem of said switch and the other of which is carried by a rotatably mounted shaft, a link connecting said levers, a lock for said shaft having a keyhole so disposed that the key when inserted will be in the path of one of said levers adjacent the position of said lever in which said ignition circuit is open, and said lock automatically locking without use of said key when said lever is moved to said position.

12. An attachment for ignition switches comprising a pair of levers one of which may be attached to the stem of said switch and the other of which is carried by a rotatably mounted shaft, a link connecting said levers, and a lock for automatically locking said shaft against rotation when moved to open said switch, and the keyhole for said lock being disposed in the path of the lever carried by said shaft in such position that when the key is inserted the lever may be moved to prevent reengagement of said lock but not far enough to close said switch until said key is removed.

13. An attachment for ignition switches comprising a pair of levers one of which may be attached to the stem of said switch and the other of which is carried by a rotatably mounted shaft, means connecting said levers, and a lock for automatically locking said shaft against rotation when moved to open said switch, and the keyhole for said lock being disposed in the path of the lever carried by said shaft in such position that when the key is inserted the lever may be moved to prevent reengagement of said lock but not far enough to close said switch until said key is removed.

14. In a motor vehicle the combination with the ignition switch, of a valve for controlling the fuel supply, means for coordinately controlling said valve and switch for rendering said motor operative or inoperative at the will of the operator, a lock for said means, and means for enforcing the removal of the key from said lock before said valve and switch may be actuated to render the vehicle in condition for operation, and said lock without use of said key automatically locking said means for controlling said switch and valve in the position in which said motor is inoperative.

15. An attachment for motor vehicles having an ignition switch comprising a lever for attachment to the stem of said switch, a valve for controlling the fuel supply for the motor, means connecting the stem of said valve and said lever, a lock for said stem of said valve acting to automatically lock the valve when moved to its closed position, and means for enforcing the removal of the key from said lock before the valve may be moved to its open position.

16. In a motor vehicle the combination with the ignition switch, of a valve for controlling the fuel supply, means for coordinately controlling said valve and switch for rendering the motor operative or inoperative at the will of the operator, a lock for automatically locking said means when the valve and switch are moved to a position which renders said motor inoperative, and means for enforcing the removal of the key from said lock before said means may be actuated to render said motor operative.

17. In a motor vehicle, an ignition switch, a valve inserted between the vacuum tank and carburetor of the fuel system, means for coordinately controlling said valve and switch for rendering said vehicle operative or inoperative at the will of the operator, a lock for said means, and means for enforcing the removal of the key from said lock before said means may be moved to render said vehicle operative, and said lock automatically without use of said key locking said means when moved to the position in which it renders said vehicle inoperative.

18. In a motor vehicle, an ignition switch, a valve inserted between the vacuum tank and carburetor of the fuel system, means for coordinately controlling said valve and switch for rendering said vehicle operative or inoperative at the will of the operator, a lock for automatically locking said switch and valve when moved to their positions which render said vehicle inoperative, and means for enforcing the removal of the key from said lock before said switch and valve may be moved to their positions which render said vehicle operative.

19. An attachment for motor vehicles having an ignition switch comprising a lever for attachment to said switch, a valve for controlling the connection between the carburetor and vacuum tank, means connecting the stem of said valve and said lever, a lock for automatically engaging said valve when moved to its closed position, and means for enforcing the removal of the key from said lock before said valve may be opened.

In testimony whereof, I have signed my name to this specification.

FRANKLIN K. YOUNG